United States Patent Office 3,410,479
Patented Nov. 12, 1968

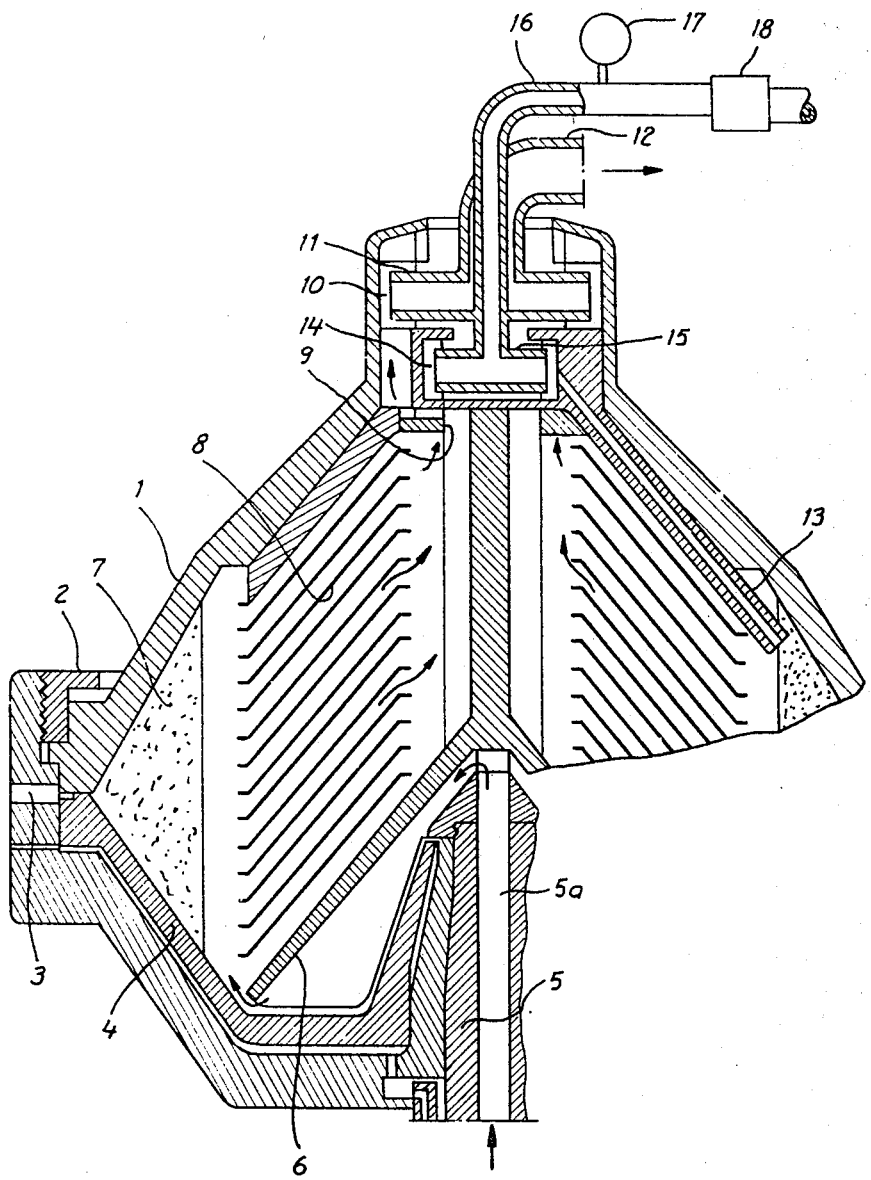

3,410,479
SLUDGE LEVEL INDICATING DEVICE FOR CENTRIFUGAL SEPARATORS
Carl-Goran Nilson, Tullinge, Sweden, assignor to Alfa-Laval AB, Tumba, Sweden, a corporation of Sweden
Filed June 30, 1966, Ser. No. 561,890
Claims priority, application Sweden, Aug. 23, 1965, 10,972/65
3 Claims. (Cl. 233—20)

ABSTRACT OF THE DISCLOSURE

The rotor of the sludge centrifuge has a channel extending inwardly toward the rotor axis and opening at its outer end into the peripheral space for accumulating sludge separated in the separating chamber of the rotor, and a stationary duct outside the rotor communicates with the inner end of this channel. Means are provided for generating a pressure pulse intermittently in the channel and also for indicating pressure changes in the stationary duct, and clogging of the channel with sludge is indicated by the resulting increased response of the pressure indicating means to the pressure pulses.

The Disclosure

The present invention relates to sludge centrifuges and more particularly to a device for indicating the sludge level in the sludge space of the centrifugal rotor.

It is known in the art to provide an indicating device including a conduit comprised of an indicating channel leading from the sludge space inwardly toward the center of the rotor. The channel is directly or indirectly connected to a duct portion of the conduit which is located outside the centrifuge. A pressure or flow sensing means is inserted in the duct to indicate clogging of the opening of the indicating channel within the sludge space. German patent specification No. 1,145,100 describes such a device.

A device of this kind has the drawback that sludge is entrained by the liquid flowing through said opening of the indicating channel to such a degree that a distinct clogging of the opening with sludge does not occur. It is desirable, however, to have a distinct indication of the condition when the sludge deposition reaches a level which dictates that the sludge ought to be discharged.

According to the present invention, the desired distinct indication is achieved by means operable intermittently to generate a pulse in the duct, preferably beyond the pressure or flow sensing means, whereby a strong response of such sensing means to the pulse is obtained only when clogging of the indicating channel becomes sufficient to resist the pulse.

The direct connection of the indicating channel to the duct provided outside the centrifuge can be constituted by a known hermetic sealing means between rotary and stationary sliding surfaces. Indirect connection to the duct can be effected by means of a paring device.

In devices of the known type described above, the liquid flow at the opening of the indicating channel flushes away sludge from the vicinity of this opening, thus preventing a distinct formation of a sludge plug in the opening irrespective of whether the liquid flow is in a direction toward the center of the rotor or outward from the center of the rotor.

According to the present invention, a much smaller flow or no flow through the opening of the indicating channel is maintained, so as to permit the formation of a distinct sludge plug in the opening. At certain intervals, for example, 10 seconds, a pressure pulse is generated in the indicating channel. If the channel opening has been clogged during such an interval by a sufficiently large quantity of sludge, the sludge plug resists the pressure pulse, and this resistance is indicated by the pressure or flow sensing means inserted in the duct. The pressure pulses can be generated at the desired intervals by a piston movable in a cylinder or by a centrifugal pump having an inlet or outlet which is intermittently opened by an automatic cyclic valve operated, for example, by an electromagnet. In principle, either the pressure or the suction side of the pressure pulse generating means can be connected to the duct leading to the centrifuge.

The invention is described more in detail in reference to the accompanying drawing in which the single illustration is a vertical sectional view of part of a self-opening sludge centrifuge provided with an embodiment of the present invention.

In the drawing, a centrifugal rotor 1 comprises two parts which are held together by a lock ring 2. In the rotor periphery are sludge outlet openings 3 which are opened and closed in a known manner by a valve piston 4. The rotor is carried and driven by a hollow shaft 5 having a central channel 5a through which liquid to be separated is supplied to the separating chamber of the rotor. The liquid enters this chamber by passing under the lower edge of a distributor 6. The centrifugally separated sludge accumulates in a sludge space 7, while the purified liquid passes through a disk set 8 inwardly toward the center or axis of the rotor and leaves the separating chamber by way of an overflow outlet 9. From this outlet, the liquid flows outwardly into a paring chamber 10 and is discharged by means of a stationary paring disk 11. This disk is connected to an outlet duct 12 for the purified liquid.

The rotor is provided with an indicating pipe 13, the bore or channel of which extends outwardly into the sludge space 7. This pipe opens at its inner end into a paring chamber 14 in which a stationary paring disk 15 is located. This disk is connected to a duct 16, in which a conventional pressure or flow sensing means 17 is provided. Such means may be arranged to effect sludge discharge automatically when the sludge level is sufficient. There is also provided in the duct 16 a pressure pulse generating means 118. The latter may be of any conventional type for periodically generating a pressure pulse in a conduit, such as a cylinder communicating with the interior of the conduit and containing a piston which is actuated at desired intervals.

In the operation of the device, the paring disk 15 normally maintains a certain pressure head in the duct 16 corresponding to the amount of liquid covering the paring disk in the paring chamber 14, without any flow taking place through the duct 16. Upon each actuation of the pulse generating means 18, a quantity of liquid is pulsed downward through duct 16 and outward through the paring disk 15 into the paring chamber 14 against the pressure generated by this paring disk. As a result, the liquid level in the paring chamber 14 moves somewhat inwardly toward the rotor axis; but as long as the outer opening of the indicating channel or pipe 13 is free, the quantity of liquid supplied by the pulse from the generating means 18 flows outwardly through the pipe 13 until equilibrium is reached. Consequently, the pressure sensing means 17 will indicate only a small pressure change, which will be insufficient to cause such means 17 to effect automatic discharge of sludge through actuation of piston valve 4. However, when the sludge deposition at the outer end of the pipe 13 becomes sufficiently great during an interval between pressure pulses in the duct 16, the next pressure pulse from the generating means 18 will not be able to escape past the sludge plug formed in the outer end of this pipe. The sensing means 17 will then indicate a substantially larger pressure change sufficient to effect a sludge discharge.

The device will operate similarly if hermetic sealing is used in lieu of the paring disk. Also, the device will operate with either positive or negative pressure pulses from the pulse generator 18.

As pointed out previously, the indicating means 17 may be of either two types, namely, the type which indicates primarily the magnitude of a pressure change or the type which indicates primarily the magnitude of a change in flow rate, it being understood that both the pressure and the flow rate in duct 16 will change in response to a pulse from generator 18 and that the magnitude of such change will depend upon whether the indicating channel 13 is clogged sufficiently to resist the pulse. Also, the generating means 18 may induce a pulse which primarily changes the pressure or one which primarily changes the flow rate. However, since a flow rate indicating means will also indicate indirectly a change in pressure, and a pulse generating means producing a change in flow rate will also produce a pressure change, such indicating means and pulse generating means are intended to be included in the pressure indicating means and the pressure pulse generating means, respectively, specified in the appended claims.

I claim:

1. In a sludge centrifuge, the combination of a centrifugal rotor mounted for rotation about an axis and having a separating chamber and an inlet for supplying feed material to said chamber, the rotor forming at its peripheral portion a space for accumulating sludge separated in said chamber, the rotor also having a channel extending inwardly toward said axis and opening at its outer end into said sludge space, a stationary duct located outside the rotor and communicating with the inner end of said channel, pressure indicating means associated with said duct to indicate pressure changes in the duct, and a pressure pulse generating means associated with said channel and operable intermittently to induce a pressure pulse in the channel, whereby the response of said indicating means to said pressure pulse is substantially increased when sludge clogs the indicating channel sufficiently to resist said pulse.

2. The combination according to claim 1, in which said pulse generating means is inserted in said duct.

3. The combination according to claim 2, in which said indicating means communicates with the duct at a location between said pulse generating means and the rotor.

References Cited
UNITED STATES PATENTS

| | | | |
|---|---|---|---|
| 2,145,544 | 1/1939 | Hapgood | 233—19 |
| 3,301,476 | 1/1967 | Hemfort | 233—20 |

HENRY T. KLINKSIEK, *Primary Examiner.*